(12) United States Patent
Loh et al.

(10) Patent No.: US 8,303,251 B2
(45) Date of Patent: Nov. 6, 2012

(54) SYSTEMS AND METHODS FOR ASSEMBLING A PITCH ASSEMBLY FOR USE IN A WIND TURBINE

(75) Inventors: Friedrich Loh, Schuettorf (DE); Detlef Menke, Lotte (DE)

(73) Assignee: General Electric Company, Schenectady, NY (US)

( * ) Notice: Subject to any disclaimer, the term of this patent is extended or adjusted under 35 U.S.C. 154(b) by 88 days.

(21) Appl. No.: 12/608,755

(22) Filed: Oct. 29, 2009

(65) Prior Publication Data
US 2010/0133830 A1 Jun. 3, 2010

(51) Int. Cl.
F03D 7/04 (2006.01)

(52) U.S. Cl. .......................................... 416/48; 416/61

(58) Field of Classification Search ............... 290/44, 290/55; 415/15, 35, 61; 416/48, 61
See application file for complete search history.

(56) References Cited

U.S. PATENT DOCUMENTS

| | | | |
|---|---|---|---|
| 4,095,547 A * | 6/1978 | Benington | 114/122 |
| 4,352,629 A | 10/1982 | Cheney, Jr. | |
| 4,355,955 A | 10/1982 | Kisovec | |
| 5,907,192 A | 5/1999 | Lyons et al. | |
| 6,265,785 B1 * | 7/2001 | Cousineau et al. | 290/44 |
| 6,465,901 B2 * | 10/2002 | Croes | 290/55 |
| 6,609,889 B1 | 8/2003 | Vilsboll | |
| 6,847,128 B2 * | 1/2005 | Mikhail et al. | 290/44 |
| 6,921,985 B2 | 7/2005 | Janssen et al. | |
| 7,095,131 B2 * | 8/2006 | Mikhail et al. | 290/44 |
| 7,218,012 B1 * | 5/2007 | Edenfeld | 290/44 |
| 7,256,509 B2 * | 8/2007 | Brandt et al. | 290/44 |
| 7,513,742 B2 | 4/2009 | Rogall et al. | |
| 2007/0057516 A1 * | 3/2007 | Mever et al. | 290/44 |
| 2007/0267872 A1 | 11/2007 | Menke | |
| 2007/0286731 A1 * | 12/2007 | Dantlgraber | 416/162 |
| 2009/0047130 A1 | 2/2009 | Egedal | |
| 2009/0129924 A1 * | 5/2009 | Rebsdorf et al. | 416/43 |
| 2009/0134624 A1 | 5/2009 | Kerber | |

* cited by examiner

*Primary Examiner* — Edward Look
*Assistant Examiner* — Sean J Younger
(74) *Attorney, Agent, or Firm* — James McGinness, Esq.; Armstrong Teasdale LLP

(57) ABSTRACT

A method of assembling a pitch assembly for use with a wind turbine. The wind turbine includes a rotor and a plurality of rotor blades coupled to the rotor. The method includes coupling a pitch drive system to at least one of the plurality of rotor blades for rotating the rotor blade about a pitch axis. At least one sensor is coupled in signal communication with the pitch drive system. The pitch drive system rotates the rotor blade when the sensor senses rotor overspeed.

16 Claims, 6 Drawing Sheets

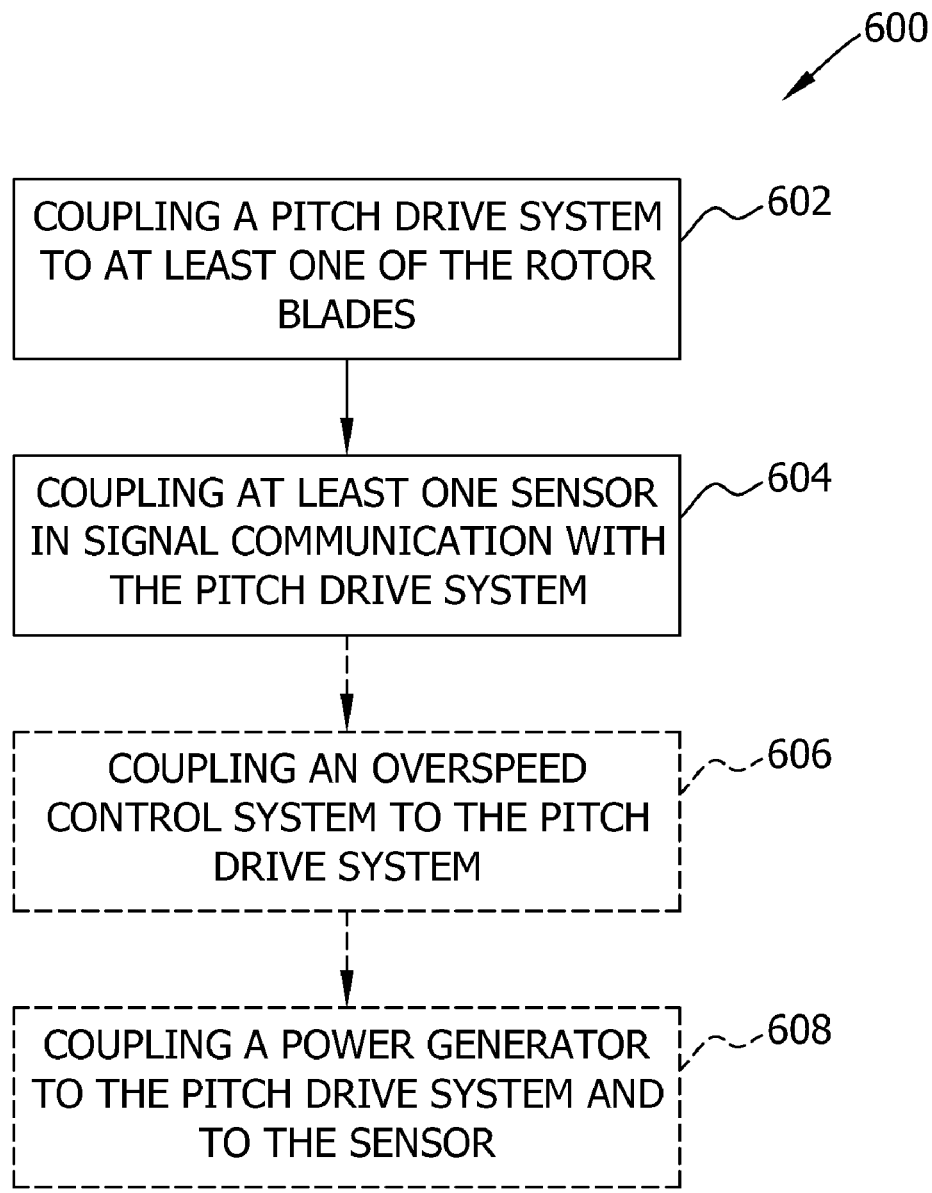

SYSTEMS AND METHODS FOR ASSEMBLING A PITCH ASSEMBLY FOR USE IN A WIND TURBINE

BACKGROUND OF THE INVENTION

The subject matter described herein relates generally to methods and systems for assembling a wind turbine including a pitch system, and more particularly, to systems and methods for assembling a pitch assembly for use in a wind turbine.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

Because many known wind turbines provide electrical power to utility grids, at least some wind turbines have larger components (e.g., rotors in excess of thirty-meters in diameter) that facilitate supplying greater quantities of electrical power. However, the larger components are often subjected to increased loads (e.g., asymmetric loads) that result from wind shears, yaw misalignment, and/or turbulence, and the increased loads have been known to contribute to significant fatigue cycles on the rotor blades and/or other components of the wind turbine.

At least some known wind turbines include a rotor blade pitch system for use in positioning the rotor blade about a pitch axis to control the speed of the rotor. At least some known wind turbines include a wind turbine control system for controlling the operations of the wind turbine, including the pitch system. In addition, at least some known wind turbines require power to operate the wind turbine control system and the pitch system. During an event of power loss and/or malfunction of the wind turbine control systems, pitch systems may not be able to operate. The power loss event may include power grid loss and/or malfunctioning of the turbine electrical system. Malfunctioning of the wind turbine control system includes failure of a wind turbine control device electrical system, a wind turbine control device communication system, and/or a mechanical system. The power loss event may lead to turbine blade overspeed during which the wind turbine control system may not be available to operate the pitch system.

Accordingly, it is desirable to provide a method and/or apparatus capable of operating the pitch system during periods of electrical power loss and/or wind turbine control system malfunction.

BRIEF DESCRIPTION OF THE INVENTION

In one aspect, a method of assembling a pitch assembly for use with a wind turbine is provided. The wind turbine includes a rotor and a plurality of rotor blades coupled to the rotor. The method includes coupling a pitch drive system to at least one of the plurality of rotor blades for rotating the rotor blade about a pitch axis. At least one sensor is coupled in signal communication with the pitch drive system. The pitch drive system rotates the rotor blade when the sensor senses rotor overspeed.

In another aspect, a pitch assembly for use with a wind turbine is provided. The wind turbine includes a rotor and at least one rotor blade coupled to the rotor. The pitch assembly includes a pitch drive system coupled to the rotor blade for rotating the rotor blade about a pitch axis. At least one sensor is mountable with respect to the rotor for sensing an overspeed of the rotor. The sensor is communicatively coupled to the pitch drive system. The pitch drive system is configured to rotate the rotor blade when the sensor senses rotor overspeed.

In yet another aspect, a wind turbine is provided. The wind turbine includes a tower, a nacelle coupled to the tower, and a rotor rotatably coupled to the nacelle. At least one blade is coupled to the rotor and configured to rotate about a pitch axis. A pitch drive system is coupled to the rotor blade for rotating the rotor blade about a pitch axis. At least one sensor is mountable with respect to the rotor for sensing an overspeed of the rotor. The sensor is communicatively coupled to the pitch drive system. The pitch drive system is configured to rotate the rotor blade when the sensor senses rotor overspeed.

By including a pitch assembly, the embodiments described herein facilitate rotating a rotor blade about a pitch axis to reduce a speed of a rotor when the rotor has reached overspeed. Further, the embodiments describe herein facilitate rotating the rotor blade about the pitch axis during a power loss and/or a malfunction of a wind turbine control system.

BRIEF DESCRIPTION OF THE DRAWINGS

FIGS. 1-6 show exemplary embodiments of the systems and methods described herein.

FIG. 1 is a perspective view of an exemplary wind turbine.

FIG. 2 is an enlarged sectional view of a portion of the wind turbine shown in FIG. 1.

FIG. 3 is a block diagram of an exemplary overspeed control system of a pitch assembly.

FIG. 4 is a schematic view of a hub of the wind turbine shown in FIG. 2.

FIG. 5 is a graphical representation of an acceleration curve of the wind turbine shown in FIG. 1.

FIG. 6 is a flow chart illustrating an exemplary method for assembling a pitch assembly suitable for use with the wind turbine in FIG. 1.

DETAILED DESCRIPTION OF THE INVENTION

The embodiments described herein include a wind turbine system that enables a pitch assembly to rotate a rotor blade about a pitch axis to reduce a rotational speed of a rotor that has reached an overspeed. More specifically, the pitch assembly described herein enables a pitch drive system to rotate a rotor blade to a feathered position when the rotor has reached overspeed. In addition, the pitch assembly described herein enables a pitch drive system to rotate a rotor blade during a wind turbine power loss event, a malfunction of the wind turbine control system, and/or any other power loss event that demands a decrease in rotor speed.

As used herein, the term "overspeed" refers to a rotational speed of a rotor at which potential damage to the rotor including damage to the rotor blade may occur. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
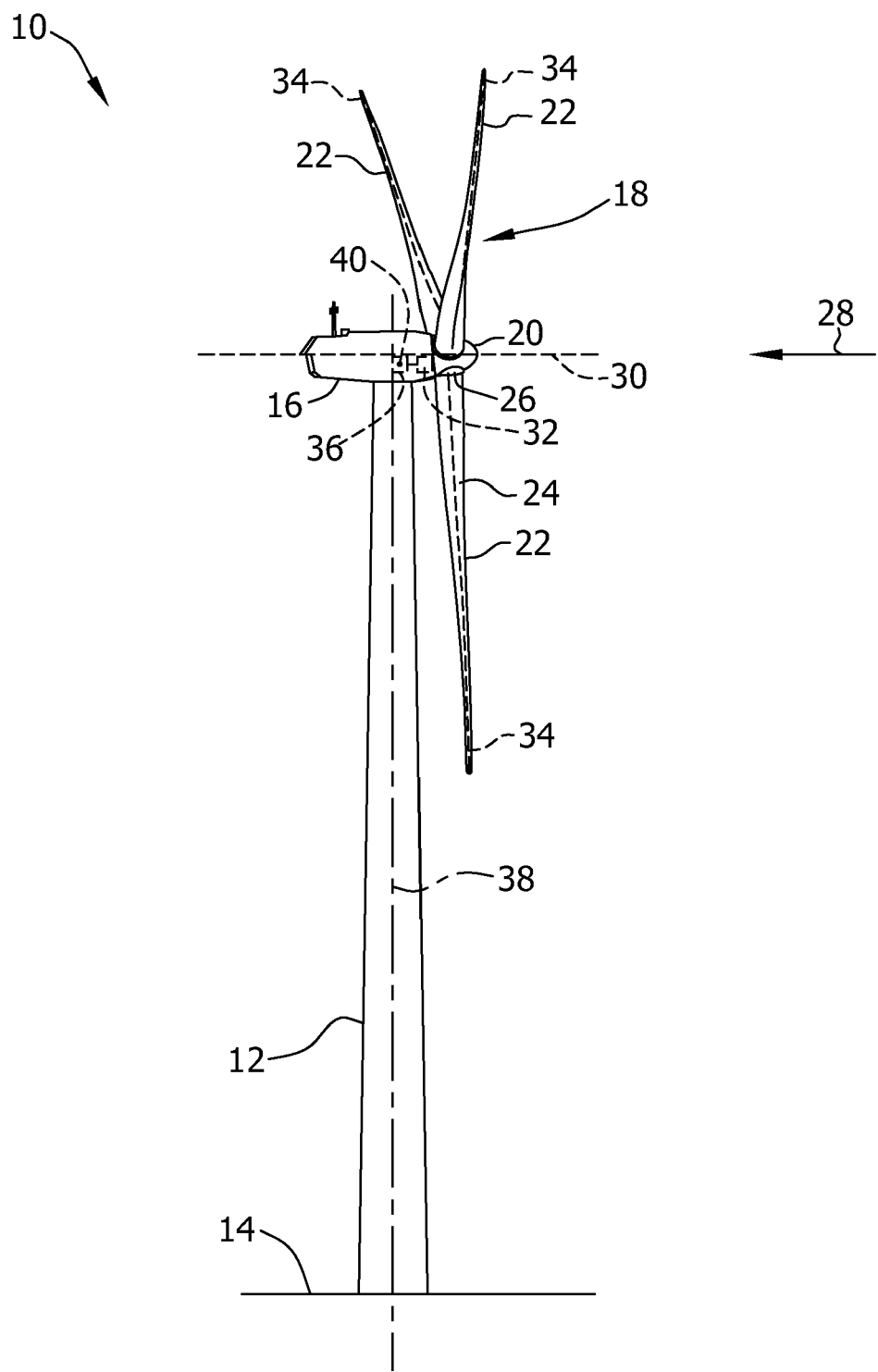

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
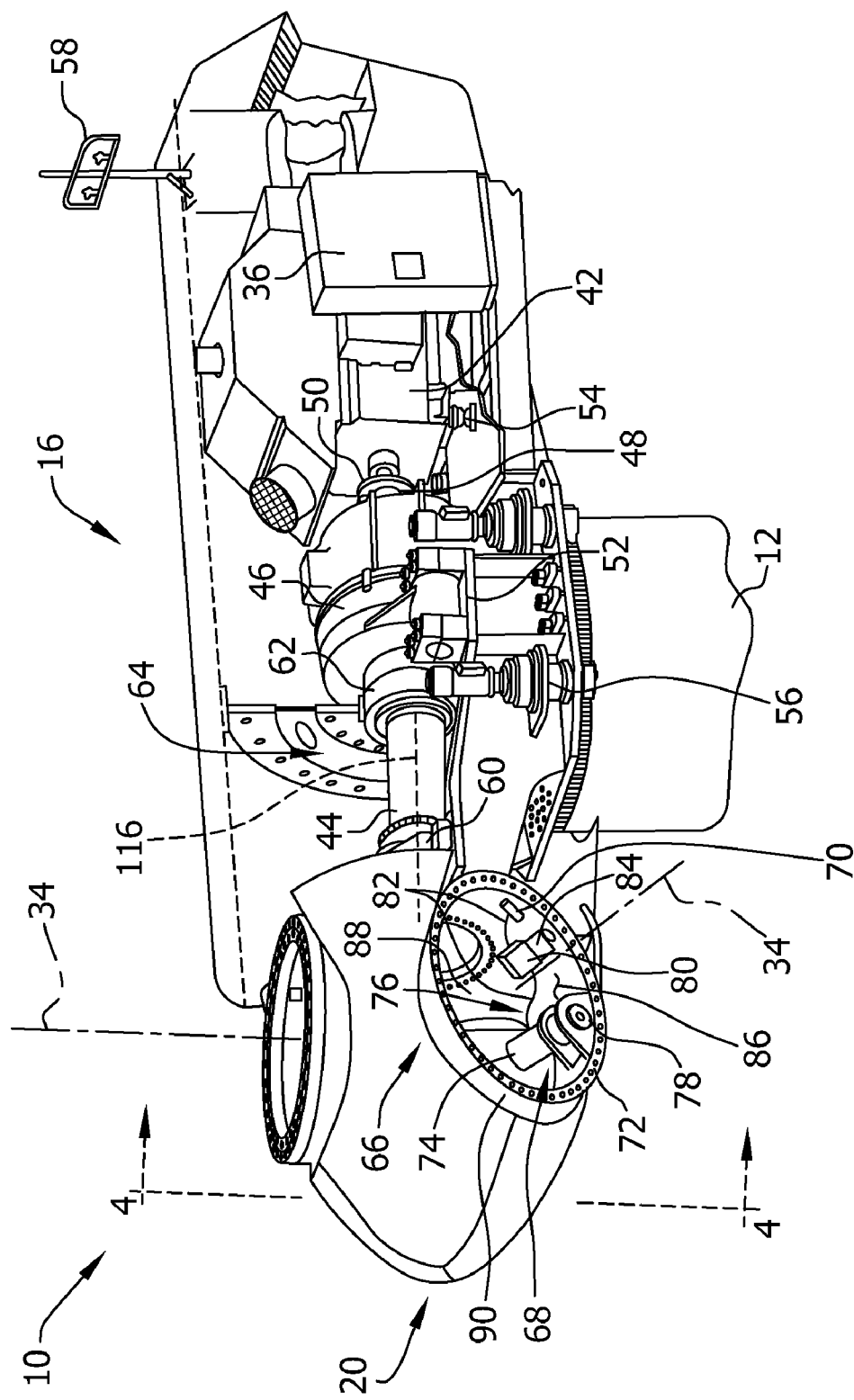

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes a at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 20 and may be coupled, directly or indirectly, to outer surface 90.

Figure 3:
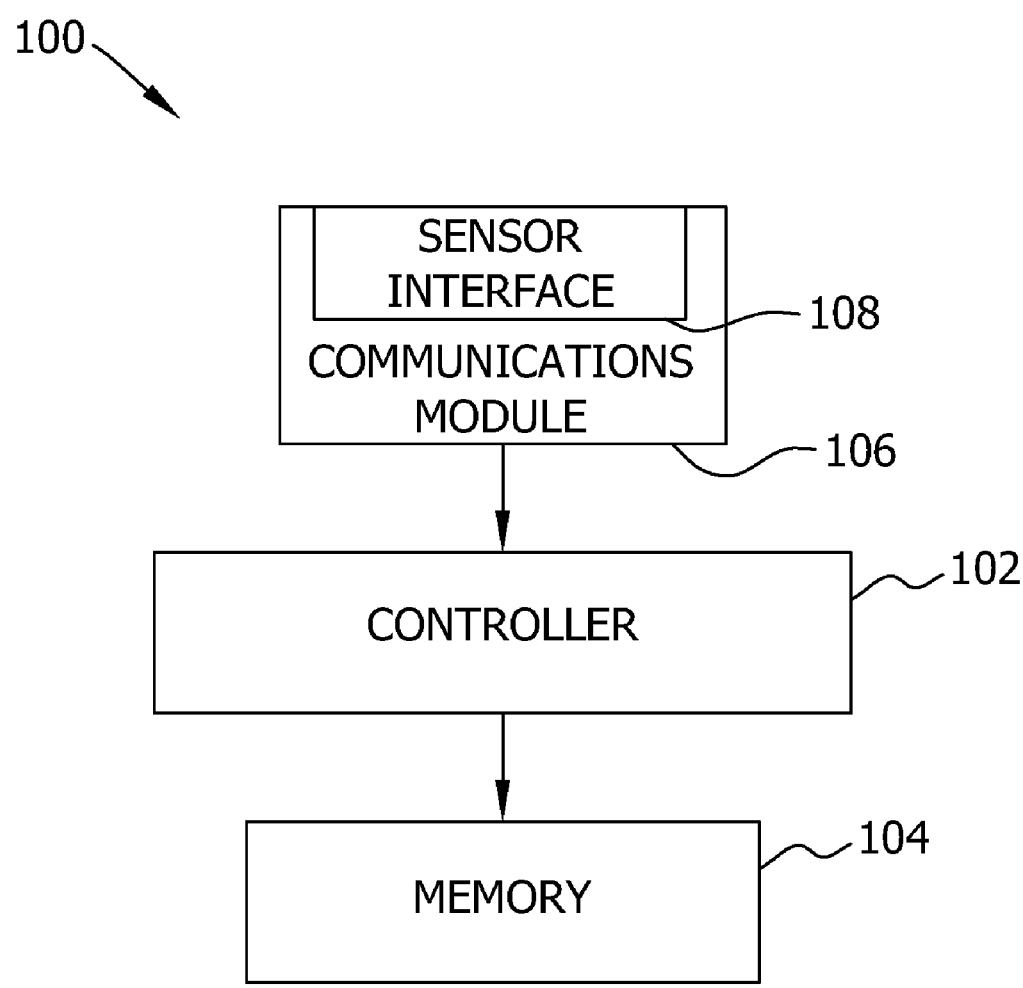

FIG. 3 is a block diagram of an exemplary overspeed control system 100. In the exemplary embodiment, overspeed control system 100 includes a controller 102, a memory 104, and a communications module 106. Overspeed control system 100 may include any suitable device that enables overspeed control system 100 to function as described herein. In the exemplary embodiment, communications module 106 includes a sensor interface 108 that facilitates enabling controller 102 to communicate with at least one sensor mounted at any suitable location on or within, or outside rotor 18. In one embodiment, sensor interface 108 includes an analog-to-digital converter that converts an analog voltage signal generated by the sensor to a multi-bit digital signal usable by controller 102. In alternative embodiments, communications module 106 may include any suitable wired and/or wireless communications device that facilitates transmitting signals to and/or receiving signals from any device located on or within, or outside rotor 18 and/or remotely from rotor 18. In the exemplary embodiment, memory 104 may include any suitable storage device, including, but not limited to, flash memory, electronically erasable programmable memory, read only memory (ROM), removable media, and/or other volatile and non-volatile storage devices. In one embodiment, executable instructions (i.e., software instructions) are stored in memory 104 for use by controller 102 in controlling pitch drive system 68, as described below.

In the exemplary embodiment, controller 102 is a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions described herein. In one embodiment, controller 102 may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring a substantially short period of time after a change in the inputs affect the outcome, with the time period being a design parameter that may be selected based on the importance of the outcome and/or the capability of the system processing the inputs to generate the outcome.

Figure 4:
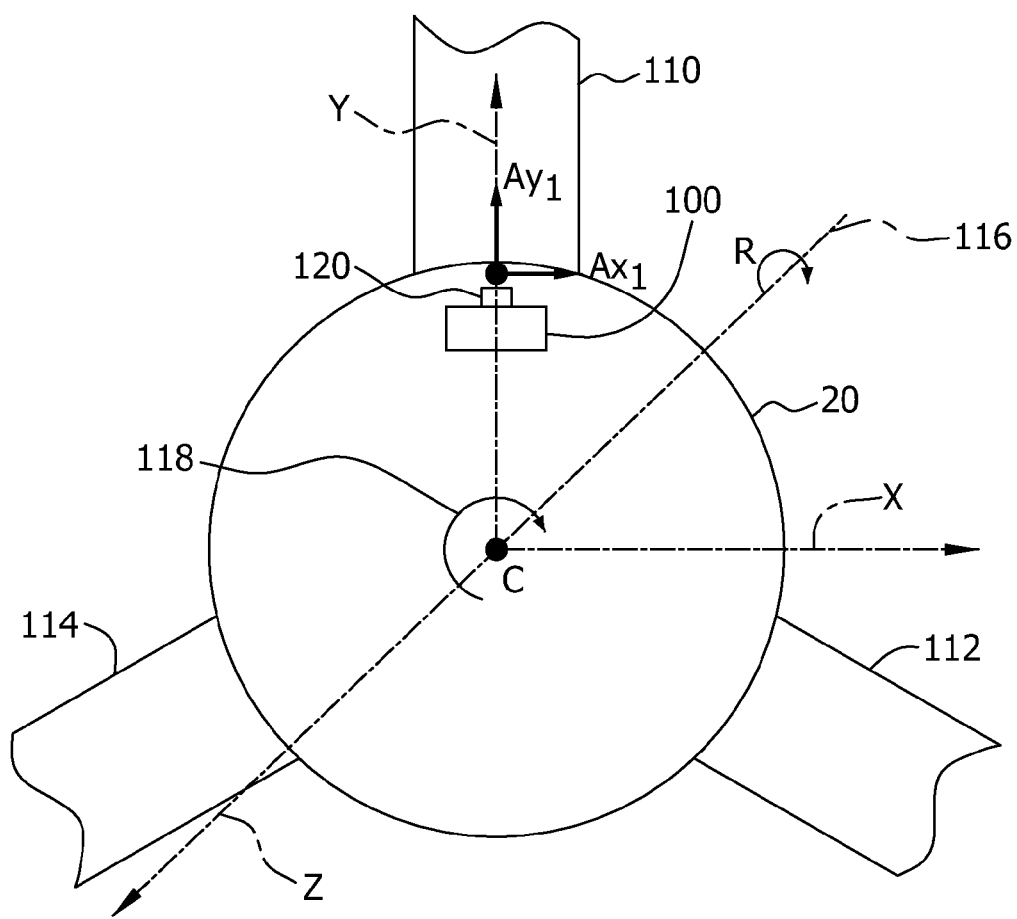

FIG. 4 is a schematic view of hub 20 taken along line 4-4 (shown in FIG. 2) with rotor blades 110, 112, 114 coupled to hub 20. In the exemplary embodiment, three mutually perpendicular axes X, Y, and Z extend through hub 20 to define a three-dimensional Cartesian coordinate system relative to a center C of hub 20. In the exemplary embodiment, axis Z is coaxial with a longitudinal axis 116 of rotor shaft 44, and axis X and axis Y intersect to form a rotational plane 118 of rotor 18. A sensor, such as an acceleration sensor 120, is mounted within hub 20 to facilitate sensing accelerations of rotor 18 in directions X and/or Y. In the exemplary embodiment, one or more acceleration sensors 120 are mounted at or near first blade 110 to facilitate sensing a first acceleration vector $A_{X1}$ of rotor 18 in a direction along axis X and a first acceleration vector $A_{Y1}$ of rotor 18 in a direction along axis Y. In an alternative embodiment, acceleration sensor 120 may be mounted at any suitable location on wind turbine 10 that enables acceleration sensor 120 to sense an acceleration of rotor 18.

During an operation of wind turbine 10, sensed acceleration vectors $A_{X1}$ and $A_{Y1}$ may have any magnitude and/or any direction, and the magnitudes and the directions shown in FIG. 4 are intended to be exemplary. In one embodiment, one or more acceleration sensors 120 may be mounted on, or adjacent to, hub 20. Alternatively, any suitable number of acceleration sensors 120 may be mounted in any suitable location within hub 20 and/or external of hub 20 that enables overspeed control system 100 to function as described herein.

In the exemplary embodiment, acceleration sensor 120 is communicatively coupled to controller 102 across any suitable wired and/or wireless communication medium via sensor interface 108 of communications module 106 to facilitate enabling acceleration sensor 120 to transmit signals to and/or receive signals from controller 102. In the exemplary embodiment, acceleration sensor 120 continuously senses accelerations of rotor 18 in the X and Y direction, and acceleration sensor 120 continuously transmits signals indicative of sensed acceleration vectors $A_{X1}$ and/or $A_{Y1}$ to controller 102 in real-time. In one embodiment, controller 102 may be programmed to continuously receive and monitor the signals transmitted by acceleration sensor 120. In an alternative embodiment, controller 102 may not continuously receive and/or monitor the signals transmitted by acceleration sensor 120 but, rather, may be programmed to iteratively request signals from acceleration sensor 120 at predetermined time intervals. In certain embodiments, controller 102 and/or acceleration sensor 120 may transmit signals to and/or receive signals from one another at any suitable time intervals.

In the exemplary embodiment, controller 102 is programmed to store the velocity function representative of an overspeed condition of rotor 18 (i.e., the rotational speed at which rotor 18 is at an overspeed condition) in memory 104. During operation of wind turbine 10, controller 102 is programmed to receive signals corresponding to sensed acceleration vectors $A_{X1}$ and/or $A_{Y1}$ from acceleration sensor 120, and controller 102 is programmed to associate an acceleration value (i.e., a value indicative of the magnitude and/or the direction of each acceleration vector) with each received signal.

After associating an acceleration value with each received signal, controller 102 is programmed to identify a rotational speed of rotor 18 in a rotational direction R, shown in FIG. 4, and/or rotational plane 118 of rotor 18 (i.e., the plane defined by axes X and Y) using at least one of the acceleration values associated with sensed acceleration vectors $A_{X1}$ and/or $A_{Y1}$. In one embodiment, controller 102 may be programmed to continuously input the acceleration values associated with sensed acceleration vectors $A_{X1}$ and/or $A_{Y1}$ into a first mathematical model that facilitates identifying the sinusoidal acceleration pattern of rotor 18 (i.e., represented graphically as a sinusoidal acceleration curve) caused, in part, by gravitational forces acting on rotor 18. For example, in one embodiment, controller 102 may be programmed to identify a sinusoidal acceleration pattern (represented graphically in FIG. 5 as an acceleration curve 506) for rotor 18 using the signals indicative of sensed accelerations $A_{Y1}$. Controller 102 is programmed to then integrate the acceleration function to express the acceleration function as a corresponding velocity function.

In the exemplary embodiment, controller 102 is further programmed to control at least one pitch drive system 68 in response to an identified rotational speed of rotor 18 to facilitate reducing the rotational speed of rotor 18. In one embodiment, controller 102 is programmed to compare an identified velocity function of rotor 18 with a stored overspeed velocity function, and to control pitch drive system 68 when an identified rotational speed is at or exceeds an overspeed rotational speed. In one embodiment, controller 102 may be configured to control pitch drive system 68 in response to an identified speed of rotor 18 to move rotor blade 22 to a feathered position to slow a rotation of rotor 18.

Figure 5:
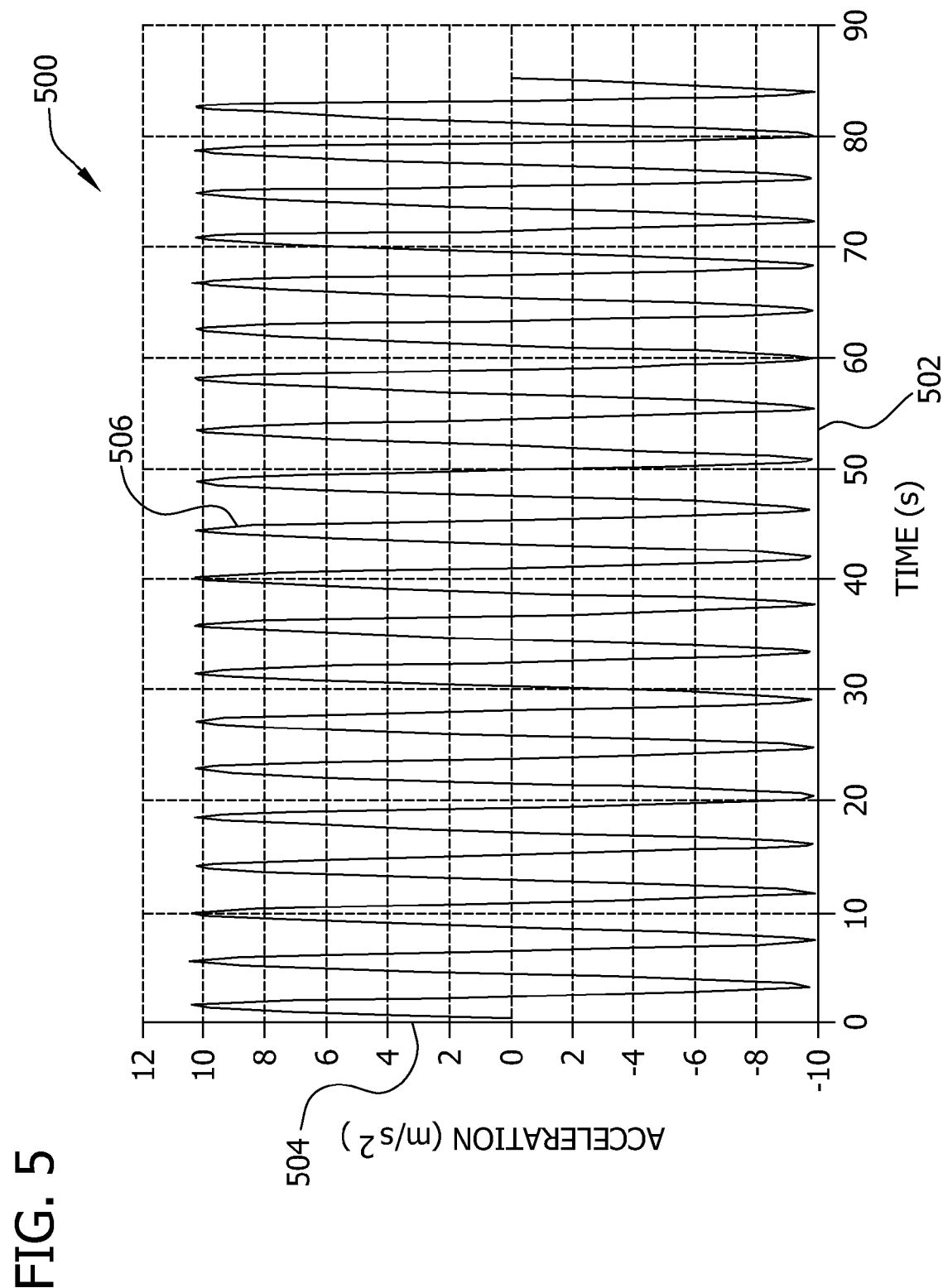

FIG. 5 is a graph 500 of exemplary traces of an acceleration of rotor 18 over a time period. The x-axis 502 displays a time period as measured in seconds (s). The y-axis 504 displays an acceleration of rotor 18 as measured in meters per second squared (m/s$^2$). Trace 506 represents a sinusoidal acceleration curve of rotor 18 that is generated by acceleration sensor 120 from sensed accelerations from one of the first acceleration vector $A_{X1}$ of rotor 18 in a direction along axis X and the first acceleration vector $A_{Y1}$ of rotor 18 in a direction along axis Y.

FIG. 6 is a flowchart of an exemplary method 600 for assembling pitch assembly 66. In the exemplary embodiment, method 600 includes coupling 602 pitch drive system 68 to at least one rotor blade 22 for rotating rotor blade 22 about pitch axis 34. At least one sensor 70 is coupled 604 in signal communication to pitch drive system 68. Pitch drive system 68 rotates rotor blade 22 when sensor 70 senses rotor overspeed. Overspeed control system 80 is optionally coupled 606 to pitch drive system 68 for operating pitch drive system 68 when the rotation of rotor 18 has reached overspeed. In this embodiment, overspeed control system 80 is configured to operate independently of wind turbine control system 36. In an alternative embodiment, sensor 70 is coupled to overspeed control system 80. Sensor 70 is configured to sense an acceleration of rotor 18 and to transmit one or more signals indicative of the sensed acceleration to overspeed control system 80. In this alternative embodiment, overspeed control system 80 is configured to receive the signals from sensor 70 and to identify a rotational speed of rotor 18 based on the received signals. In another embodiment, power generator 84 is optionally coupled 608 to pitch drive system 68 and to sensor 70 to provide a source of power to pitch assembly 66 during an electrical power loss event effecting wind turbine 10.

The above-described systems and methods facilitate operating a pitch assembly to rotate a rotor blade about a pitch axis to reduce a rotational speed of a rotor that has reached an overspeed. More specifically, when the rotor has reached overspeed, the pitch assembly described herein rotates the rotor blade to a feathered position to slow the rotational speed of the rotor. Further, the system described herein facilitates operation of the pitch assembly to rotate the rotor blade during an electrical power loss event, malfunction of the wind turbine control system, and/or any other power loss event that demands a decrease in rotor speed. As such, the damage that can occur to a rotor blade during rotor overspeed is reduced or eliminated, thereby extending the operational life of a wind turbine.

Exemplary embodiments of systems and methods for assembling a pitch assembly for use in a wind turbine are described above in detail. The systems and methods are not limited to the specific embodiments described herein, but rather, components of the systems and/or steps of the methods may be utilized independently and separately from other components and/or steps described herein. For example, the methods may also be used in combination with other pitch assemblies, and are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a pitch assembly for use with a wind turbine including a wind turbine controller and a rotor that includes a plurality of rotor blades coupled to a hub, said method comprising:
    coupling a pitch drive system to at least one rotor blade of the plurality of rotor blades for rotating the rotor blade about a pitch axis;
    coupling the pitch drive system to the wind turbine controller, the wind turbine controller configured to modulate a pitch of the at least one rotor blade to facilitate adjusting a power generated by the wind turbine;
    coupling an overspeed controller to the pitch drive system, such that the overspeed controller is positioned within the hub and is configured to operate the pitch drive system when the rotor is operating at overspeed, the overspeed controller is further configured to operate independently of the wind turbine controller and to override the wind turbine controller when the rotor is operating at overspeed;
    coupling a sensor to an inner surface of the hub; and,
    coupling the sensor in signal communication with the overspeed controller, wherein the sensor is configured to sense an acceleration of the rotor and to transmit a signal indicative of the sensed acceleration to the overspeed controller, wherein the controller inputs the sensed acceleration values into a first mathematical model to determine an acceleration function, converts the acceleration function to a velocity function, and compares the velocity function with a stored overspeed velocity function to determine an overspeed condition.

2. A method in accordance with claim 1, further comprising coupling the sensor adjacent to the rotor blade and oriented within a rotational plane of the rotor.

3. A method in accordance with claim 1, said method further comprising coupling a power generator to the pitch drive system and to the sensor for providing power to the pitch assembly during a wind turbine power loss.

4. A pitch assembly for use with a wind turbine including a wind turbine controller and a rotor that includes a hub and at least one rotor blade coupled to the hub, said pitch assembly comprising:
    a pitch drive system coupled to the rotor blade for rotating the rotor blade about a pitch axis, the wind turbine controller coupled to said pitch drive system for modulating a pitch of the rotor blade to facilitate adjusting a power generated by the wind turbine;
    an overspeed controller positioned within the hub, said overspeed controller coupled to said pitch drive system for operating said pitch drive system when the rotor has reached overspeed, said overspeed controller configured to operate independently of the wind turbine controller and to override the wind turbine controller when the rotor has reached overspeed; and,
    a sensor coupled to an inner surface of the hub for sensing an acceleration of the rotor, said sensor communicatively coupled to said overspeed controller for transmitting a signal indicative of the sensed acceleration to said overspeed controller, wherein the controller is configured to input the sensed acceleration values into a first mathematical model to determine an acceleration function, convert the acceleration function to a velocity function, and compare the velocity function with a stored overspeed velocity function to determine an overspeed condition.

5. A pitch assembly in accordance with claim 4, wherein said pitch drive system rotates the rotor blade to a feathered position when said sensor senses rotor overspeed.

6. A pitch assembly in accordance with claim 4, wherein said pitch drive system is positioned within the hub.

7. A pitch assembly in accordance with claim 4, wherein said pitch drive system is coupled to an outer surface of the hub.

8. A pitch assembly in accordance with claim 4, wherein said sensor is positioned within a rotational plane of the rotor and is configured to measure a rotor speed in the rotational plane.

9. A pitch assembly in accordance with claim 4, further comprising a power generator coupled to said pitch drive system and to said sensor, said power generator configured to provide power during a wind turbine power loss event.

10. A pitch assembly in accordance with claim 9, wherein said power generator is positioned within the hub.

11. A pitch assembly in accordance with claim 4, wherein said overspeed controller is programmed to:
    identify an overspeed of the rotor;
    calculate the speed of the rotor relative to the overspeed; and, operate said pitch drive system to move the rotor blade to a feathered position when the calculated speed of the rotor is at or exceeds overspeed.

12. A wind turbine, comprising:

a tower;

a nacelle coupled to said tower;

a rotor comprising a hub rotatably coupled to said nacelle;

at least one blade coupled to said hub and configured to rotate about a pitch axis;

a pitch drive system coupled to said rotor blade for rotating said rotor blade about the pitch axis;

a wind turbine controller coupled to said pitch drive system for modulating a pitch of said rotor blade to facilitate adjusting a power generated by said wind turbine;

an overspeed controller positioned within the hub and coupled to said pitch drive system for operating said pitch drive system when said rotor has reached overspeed, said overspeed controller further configured to operate independently of said wind turbine controller and to override said wind turbine controller when said rotor has reached overspeed; and, a sensor coupled to an inner surface of said hub for sensing an acceleration of the rotor, said sensor communicatively coupled to said overspeed controller for transmitting a signal indicative of the sensed acceleration to said overspeed controller, wherein the overspeed controller is configured to input the sensed acceleration values into a first mathematical model to determine an acceleration function, convert the acceleration function to a velocity function, and compare the velocity function with a stored overspeed velocity function to determine an overspeed condition.

13. A wind turbine in accordance with claim 12, wherein said pitch drive system rotates the rotor blade to a feathered position when the rotor is in overspeed.

14. A wind turbine in accordance with claim 12, wherein said sensor is positioned within a rotational plane of said rotor and is configured to measure a speed in the rotational plane.

15. A wind turbine in accordance with claim 12, further comprising a power generator coupled to said pitch drive system and to said sensor for providing power to said pitch drive system and to said sensor during a wind turbine power loss event.

16. A wind turbine in accordance with claim 15, wherein said power generator is positioned within said hub.

\* \* \* \* \*